United States Patent Office 3,669,748
Patented June 13, 1972

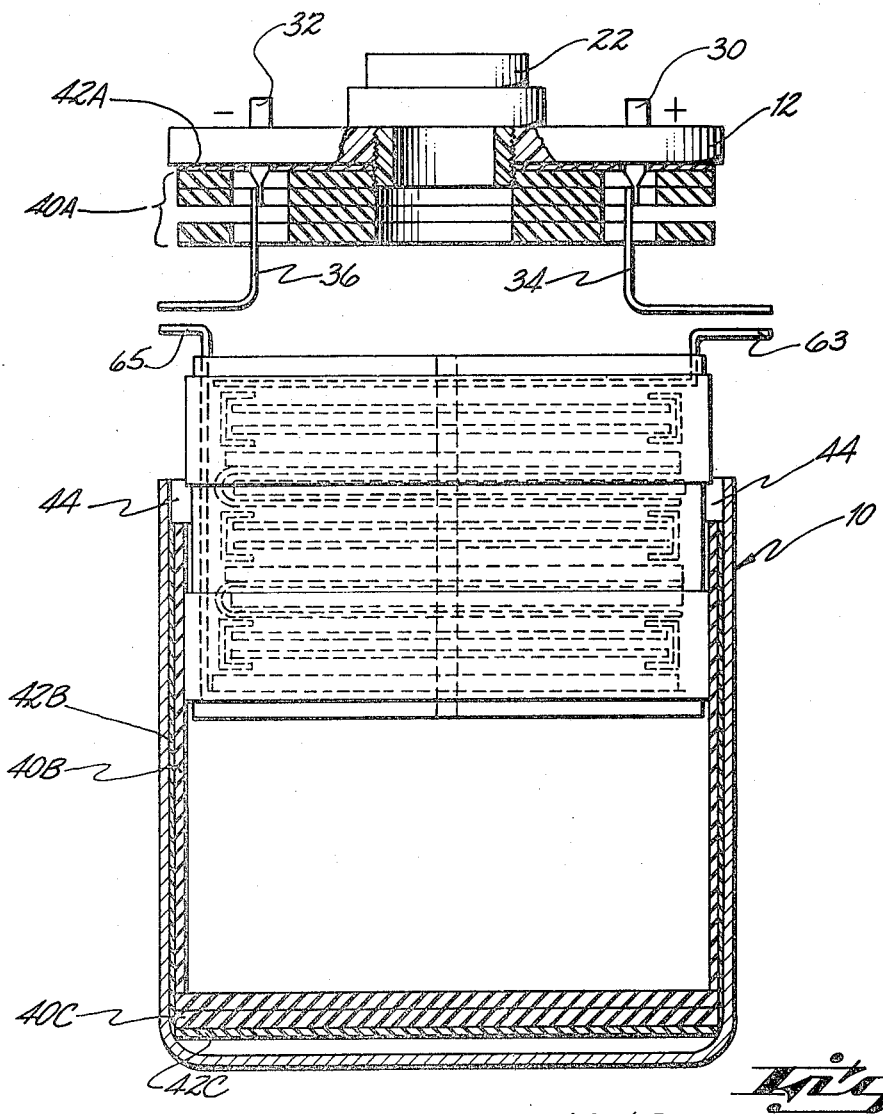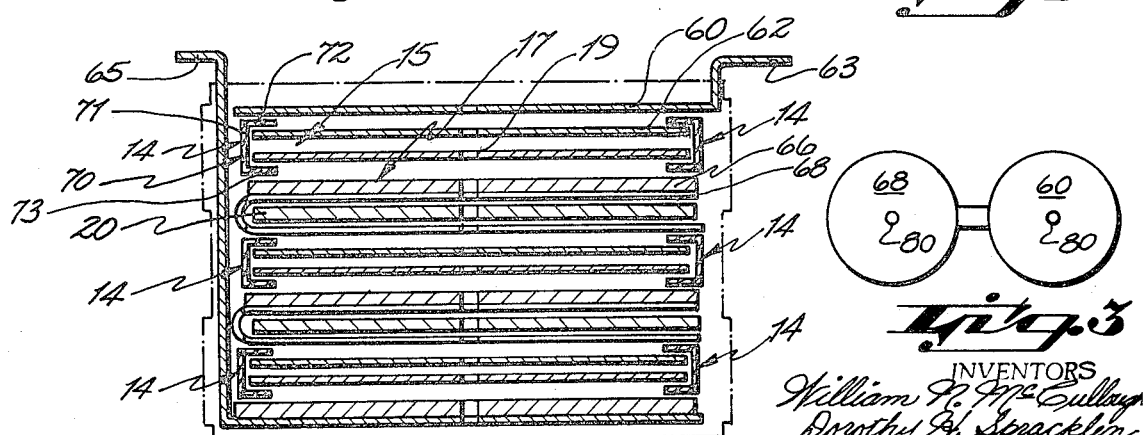

3,669,748
THERMAL BATTERY
William N. McCullough, Joplin, Mo., and Edwin E. Spracklen, deceased, late of Joplin, Mo., by Dorothy H. Spracklen, legal representative, Joplin, Mo.; said McCullough assignor to Eagle-Picher Industries, Inc., Cincinnati, Ohio
Continuation of application Ser. No. 763,483, Sept. 16, 1968. This application June 8, 1970, Ser. No. 48,797
Int. Cl. H01m 21/14, 17/06
U.S. Cl. 136—83 T       2 Claims

ABSTRACT OF THE DISCLOSURE

A thermal battery having a plurality of stacked electro-chemical couples each including a pair of positive and negative electrodes between which is sandwiched a solid electrolyte liquifiable when sufficiently heated to provide substantially instantaneous battery activation, and a plurality of insulating rings each associated with a different pair of electrodes and enclosing the peripheral edge of only one of the electrodes of the associated pair for preventing alloys which form by chemical interaction of the electrolyte and one or more of the electrodes from bridging and thereby short-circuiting the electrode pair. In a preferred thermal battery, the insulating ring of each couple also encloses the peripheral edge of the electrolyte, preventing the electrolyte, when liquified, from leaving the space between the electrodes and thereby increasing the battery internal resistance and decreasing its output voltage.

---

This application is a continuation of application Ser. No. 763,483, in the names of William N. McCullough et al., filed Sept. 16, 1968, now abandoned.

This invention relates to batteries and more particularly to thermal batteries of the type using a normally solid state electrolyte which can be rendered molten by an internally contained heat source to provide substantially instantaneous battery activation.

Thermal batteries typically include a number of stacked electro-chemical couples, each of which includes a pair of opposite polarity electrodes positioned on opposite sides of an electrolyte. Under normal conditions the electrolyte is in a solid state, preventing ionic conduction between the electrodes which is necessary for battery action. Under such circumstances the battery is de-activated. However, under certain conditions, namely, when heat is applied to the electrolyte, the electrolyte can be transformed to a liquid state, permitting ionic conduction between the electrodes and thereby enabling battery action to result.

The heat necessary for liquifying the electrolyte and thereby activating the battery is typically provided by means of a plurality of heat sources interleaved with the electrode pairs. The heat sources are in wafer form and fabricated of suitable combustible material which can be selectively ignited by an electrical or percussion actuated primer or thermal match, which also forms a portion of the battery, providing instantaneous heat to liquify the electrolyte and activate the battery with negligible intervening delay.

Thermal batteries of the above type are susceptive of remote activation under the control of electric signals transmitted to the thermal match or primer from a distant point. Because of this remote control battery activation capability, and because the battery, when activated, is activated substantially instantaneously, thermal batteries have found widespread acceptance in space and guided missile applications. When used in such applications two problems have been found to exist. Each of these problems is, at least in part, attributable to the high forces to which the battery is subjected when the vehicle in which the battery is contained undergoes large accelerations or decelerations. Such large accelerations and decelerations not infrequently occur when the vehicle in which the battery is carried is a missile or similar space vehicle.

One of the problems found to exist by reason of accelerating and decelerating forces exerted on thermal batteries involves short-circuiting of the opposite polarity electrodes of one or more couples comprising the battery when conductive alloys, which form at the junction of the electrolyte and one or more of the electrodes, are forced from between the electrodes to the peripheral edges thereof and electrically bridge the electrodes, thereby short-circuiting the associated electrode pair. The other problem found to exist in thermal batteries used in missile and space applications where high acceleration and/or deceleration forces are encountered involves the tendency of the electrolyte, when liquified, to flow or ooze from between the electrodes. When this occurs, the volume of electrolyte between the electrodes is reduced, lowering the inter-electrode conductivity which, as a consequence, raises the internal resistance of the battery, providing an overall decrease in battery output voltage.

It has been an objective of this invention to provide a thermal battery of the type employing stacked pairs of opposite polarity electrodes sandwiching liquifiable electrolytes, which is not subject to electrode short-circuiting attributable to the formation of conductive alloys at the electrode-electrolyte interface which move to the peripheral edges of the electrodes where it is possible to bridge the electrodes and thereby short-circuit a portion of the battery. This objective has been accomplished in accordance with certain principles of this invention by providing each opposite polarity electrode pair and sandwiched electrolyte with an insulative ring which encloses the peripheral edge of only one of the electrodes of the pair. With the insulative ring of this invention, conductive alloys formed by chemical interaction of the electrolyte and one or more of the electrodes, even if it does flow from between the electrodes, cannot bridge the electrodes of that pair and thereby short-circuit a portion of the battery.

In a preferred form of this invention, the insulative ring, in addition to enclosing the peripheral edge of only one of the opposite polarity electrodes of the pair with which it is associated, also encloses the peripheral edge of the electrolyte, reducing the tendency of the electrolyte, when liquified, to ooze from between the plates which sandwich it and thereby increase the internal battery resistance and lower the output battery voltage.

Other objectives and advantages of this invention will be more readily apparent from a detailed description of the invention taken in conjunction with the accompanying drawings in which:

FIG. 1 is a partially exploded elevational view in cross-section and of a preferred thermal battery embodying the principles of this invention.

FIG. 2 is an elevational view in cross-section of a portion of the battery depicted in FIG. 1, showing the relationship of the electrodes, electrolyte, internal heat source, and insulative ring.

FIG. 3 is a plan view of a preferred collector.

As depicted in FIG. 1, a thermal battery of the type in which this invention finds substantial utility and modified to include the improvement of this invention generally includes an open-ended battery casing 10 adapted to be closed by a cover 12 for sealing within the casing a stacked array of electro-chemical couples 14, of which three couples are shown. Each couple 14 includes a pair of opposite polarity electrode assemblies 15 and 17 and an electrolyte 19 sandwiched therebetween. The electrolyte 19 is normally solid, but is adapted to be liquified to substantially instantaneously activate the couple 14 with which it is associated. The battery also includes suitable heat sources 20 in heat transmitting relationship to the electrolytes 19, and which preferably are located between the couples 14. An igniter 22, for example, an electrically actuated match or percussion actuated primer, is mounted in the cover 12 and communicates with the interior of the battery casing for igniting the heat sources 20, when actuated, thereby initiating the application of heat to the electrolyte 19 which is necessary to render it liquid and susceptive of sustaining ionic conduction necessary for battery action. The battery further includes a pair of positive and negative terminals 30 and 32, respectively, whose upper ends project above the cover for connection to a suitable utilization device, and whose lower ends project into the interior of the battery casing for connection via suitable leads 34 and 36 to appropriate ones of the battery electrodes. The terminals 30 and 32 are hermetically sealed in the cover 12. Suitable thermal insulating material 40A, 40B and 40C and electrical insulating material 42A, 42B and 42C line the top, sides and bottom of the battery casing and cover, respectively, to enhance the electrical and thermal integrity of the battery.

The battery casing 10 preferably is cylindrical and formed of suitable material, such as stainless steel, chemically compatible with the battery components and environment in which it is used. The thickness of the battery casing is controlled by strength considerations, the thickness being sufficient to enable the casing to withstand the internal pressures to which it is subjected when the igniter 22 and heat source 20 are combusted. The diameter and height of the casing 10 depend in part upon the size and number of couples 14, and the amount of thermal insulating material 40 utilized. In practice, if the couples 14 are connected in parallel, the number of couples is a function of the desired battery capacity, the number being larger for greater capacities, while if the couples are connected in series the number of couples depends upon the output voltage desired, the number being greater for larger voltages. The quantity of thermal insulating material 40 depends upon the duration for which the battery is to remain operative once activated, and is larger where the operational period is longer.

The casing cover 12, like the casing 10, preferably is chemically compatible with the battery components and its environment, and has a thickness and diameter dependent upon the diameter of the couples 14 and the internal pressure developed by combustion of the heat sources 20 and primer 22. Preferably, the diameter of the cover 12 is selected to afford a snug fit between its periphery and the internal marginal portion 44 of the casing 10, providing a hermetic seal when the cover is secured to the casing by suitable means such as by a weldment.

The electrically insulative lining 42A, 42B and 42C separating the casing 10 and cover 12 from the couples 14 is preferably fabricated of mica sheet material having a thickness of approximately .005–.015 inch, although the lining may be fabricated of other suitable materials capable of electrically isolating the battery casing 10 and cover 12 from the couples 14. The thermally insulative lining 40A, 40B and 40C preferably is asbestos, having a minimum thickness of .250 inch at the side walls and a thickness substantially in excess of .250 inch adjacent the cover 12 and casing bottom. The added thickness of asbestos at the top and bottom facilitates the absorption of axial shock when the missile or other space vehicle within which the battery is typically axially disposed is subjected to high deceleration and/or acceleration forces.

The couples 14, as noted previously, each include the positive electrode assembly 15 and the negative electrode assembly 17. Between the positive and negative electrode assemblies 15 and 17 is sandwiched the normally solid electrolyte 19 which is adapted to be liquified and rendered susceptive of sustaining an ionic current in response to the application of an amount of heat thereto sufficient to elevate the electrolyte above its melting point. Positioned between the couples 14 are the heat sources 20 which are combusted by the igniter 22. In use, the positive and negative electrode assemblies 15 and 17, the electrolytes 19 and the heat sources 20 are tightly compressed and therefore each intimately contacts their adjacent couple components.

Each positive electrode assembly 15 includes an electrically conductive collector 60, and a depolarizer 62 which constitutes the cathode of the couple 14. In use, the collector 60 and depolarizer 62 are in intimate contact. The collector 60 preferably is circular and fabricated of nickel or steel having a thickness of .005 inch and a diameter of 1.25 inches. The collector 60 of the uppermost couple 14 has extending therefrom an electrically conductive tab 63 which is connectable to the lead 34 by suitable means such as spot welding to provide the necessary electrical connection between the positive electrode assembly 15 and the positive battery terminal 30.

The depolarizer 62 is preferably calcium chromate ($CaCrO_4$) sheet material having a thickness of approximately .015–0.20 inch. The calcium chromate may be fabricated in sheet form by utilizing suitable powder metallurgical techniques, namely, by subjecting powdered calcium chromate to a compressional force of approximately twenty tons per square inch. Other chromate compounds may be utilized in the depolarizer 62 as substitutes for calcium chromate, for example, sodium chromate ($Na_2CrO_4$) and potassium chromate ($K_2CrO_4$). The diameter of the depolarizer 62 preferably is slightly less than the diameter of its associated collector 60. With a diameter and thickness of the order indicated, approximately 0.8 gram of calcium chromate is required for the depolarizer 62.

The negative electrode assembly 17 includes a sheet of calcium 66 which constitutes the anode of the couple 14, and a collector 68. The collector 68 and anode 66 are in intimate contact in use. The anode 66 has a diameter approximately equal to the diameter of the depolarizer 62, a thickness of approximately .005–.010 inch, and a weight on the order of 0.4 gram. Magnesium, if desired, may be substituted for the calcium of anode sheet 66. The negative collector 68, like the positive collector 60, is preferably circular and fabricated of nickel or steel sheet material having a thickness of approximately .005 inch and a diameter coextensive with that of the anode 66. The collector 68 of the lowermost couple 14 is provided with a tab 65 for electrically connecting via lead 36 the negative electrode assembly 17 to the negative battery terminal 32. The anode 66 also preferably is adhered to the negative collector 68. Such adhesion can be effected by suitably perforating the collector 68, and pressing together the collector 68 and calcium sheet anode 66 under a pressure of approximately two tons per square inch.

The electrolyte 19 preferably comprises, by weight 10% kaolin and 90% dry mixture of lithium chloride and potassium chloride. The lithium chloride and potassium chloride are preferably mixed in the ratio of 44 parts by weight lithium chloride to 56 parts by weight potassium chloride, forming a eutectic mixture. The electrolyte 19 is normally solid and becomes liquified when heated to a temperature of 354° C. At this temperature the eutectic mixture melts, becoming a one-phase liquid solution of the two electrolytic salts, lithium chloride and potassium chloride. In practice, the kaolin and the eutectic mixture of lithium chloride and potassium chloride are impregnated in glass cloth to support the electrolyte in disc form. With positive and negative electrode assemblies 15 and 17 having the dimensions indicated above, the electrolyte 19 has a thickness on the order of .050 inch, a diameter approximately that of the depolarizer 62, and a weight of approximately 0.2 gram.

The kaolin serves as a porous matrix for the eutectic mixture when the latter is liquified, giving the electrolyte mechanical stability, and thereby reducing the tendency of the liquified electrolyte to ooze from between the positive and negative electrode assemblies 15 and 17 which increases the internal battery resistance and, hence, decreases the battery output voltage. The kaolin also functions as a conventional separator between the electrodes.

Calcium is more electro-positive than lithium in the fused lithium chloride-potassium chloride eutectic, and therefore replaces it to form a lithium-calcium alloy which is electrically conductive. To prevent conductive alloys, such as the calcium-lithium alloys formed by the chemical interaction of the calcium sheet anode 66 and the electrolyte 19 at their interface, from flowing or otherwise moving to the periphery of the couple 14 whereat it is possible for the alloy to bridge the positive and negative electrode assemblies 15 and 17 and thereby short-circuit the couple, and to additionally inhibit undesirable oozing of the liquified electrolyte 19 from between the negative and positive electrode assemblies, thereby increasing internal battery resistance and lowering battery output voltage, each couple 14 is provided with an electrically insulative ring 70.

Preferably, the ring 70 is fabricated of pure rag free long fibre asbestos commercially available from sources such as The Johns Manville Company. The particular insulative material from which the ring 70 is fabricated is not critical except to the extent that it must be electrically insulating and be capable of withstanding the operating temperature of the battery to which it is subjected. The insulative ring 70 is preferably integral, and has a central vertical section 71 and upper and lower horizontally extending lips 72 and 73. The length of the central section 71 in the vertical direction in a preferred form is at least as long as the combined thickness of the active cathode material or depolarizer 62 and the electrolyte 19, while the dimension of the upper and lower lips 72 and 73 in the horizontal direction is sufficient to adequately enclose the exposed peripheral edges of the depolarizer 62 and electrolyte 19 and preferably approximates .050 inch. The thickness of the lips 72 and 73 and the vertical section 71, when fabricated of the preferred material noted, is approximately .010 inch, although other thicknesses may be used depending upon the degree of electrical insulation desired.

The heat sources 20 are each in the form of discs having a diameter substantially equal to that of the diameters of the electrode assemblies 15 and 17. The heat sources 20 preferably are fabricated of thermit material, such as a mixture of powdered iron oxide ($Fe_2O_3$) and powdered aluminum, and burn rapidly, providing intense heat. The thickness of the heat sources 20 is selected to provide the amount of heat necessary to melt the electrolyte 19 and maintain it in a molten condition until the depolarizer 62 and/or the calcium sheet or anode 66 have become exhausted by electro-chemical battery action. With heat sources 20 fabricated of the thermit material noted, a heat source thickness of approximately .025–.030 inch is satisfactory.

The couples 14 in the battery configuration shown in FIGS. 1 and 2 are connected serially by conductive links 77 which interconnect the negative collector 68 of one couple 14 with the positive collector 60 of the couple adjacent thereto. As shown in FIG. 3, the connecting link 77 may be integral with the negative collector 68 and positive collector 60 of adjacent electrode assemblies. Such an integral collector and link assembly may be provided in the general shape of a dumbbell having substantially equal circular collector sections 60 and 68 connected by the central necked section or link 77. The circular collector sections 60 and 68 when folded parallel to each other automatically electrically connected by reason of the integral necked central section or link 77 which interconnects them.

The igniter 22, as indicated, may be of varied design, such as an electrically-actuated thermal match or a percussion-actuated pyrotechnic primer. A pyrotechnic primer such as commercially available from Olin Mathieson Chemical Corporation, designated Model M–42–G, has been found satisfactory. Such a primer is actuated in response to a percussion having an impulse of 22–28 inch-ounces, and in practice is enclosed within a primer holder 22A having a threaded cylindrical exterior 22B which can be threaded into a suitably provided internally threaded aperture 80 formed in the cover 12. The primer 22 when actuated directs an intense flame down the center of the stacked couples 14 via suitable central apertures 80 provided in the positive and negative collectors 60 and 68, the depolarizer 62, electrolyte 19 and calcium sheet anode 66 of each couple. The intense flame from the actuated primer 22 functions to ignite the combustible heat sources 20 and thereby initiate melting of the electrolyte 19.

In operation a suitable electrical load (not shown) is connected between the positive and negative battery terminals 30 and 32, respectively. When energization of the electrical load (not shown) is desired, the igniter 22 is actuated. In the case of pyrotechnic primer of the type noted previously, actuation is accomplished by subjecting the primer to a blow sufficient to produce an impulse of 22–28 inch-ounces. Actuation of the igniter 22 sends a flame through the central channel formed by the apertures 80 in the various elements of the couples 14. The flame from the igniter 22 causes the heat sources 20 to combust. Combustion of the heat sources 20 generates an amount of heat sufficient to raise the temperature of the electrolyte 19 above its melting point, namely, 354° C., in the case of the lithium chloride and potassium chloride eutectic mixture noted previously. When the temperature of the electrolyte 19 reaches its melting point, which takes only a fraction of a second after combustion of the heat sources 20, the electrolyte changes from its normally solid state to a liquid or molten state. With the electrolyte molten, it is capable of sustaining ionic conduction necessary for the electro-chemical action characterizing battery operation. At this point, the battery is activated and a voltage appears across the battery terminals 30 and 32.

The open circuit voltage of the terminals 30 and 32 is, of course, a function of both the manner in which the couples 14 are connected, namely, in series or in parallel, as well as the number of couples if series connected. The theoretical open circuit voltage of a single couple 14 of the preferred anode and cathode construction described is 2.65 volts.

The electro-chemical action of the couple 14 is believed governed by the following equation:

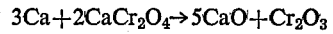
$$3Ca + 2CaCr_2O_4 \rightarrow 5CaO + Cr_2O_3$$

The electro-chemical action at the calcium sheet 66, which constitutes the anode of each electro-chemical couple 14 and which is oxidized, is believed governed by the following equation:

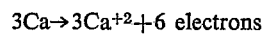
$$3Ca \rightarrow 3Ca^{+2} + 6 \text{ electrons}$$

The electro-chemical action at the depolarizer 62, which constitutes the cathode of the electro-chemical couple 14 and which is reduced, is governed by the following equation:

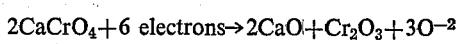
$$2CaCrO_4 + 6 \text{ electrons} \rightarrow 2CaO + Cr_2O_3 + 3O^{-2}$$

The electro-chemical battery action governed by the foregoing equations, once initiated by melting of the electrolyte 19, continues until either or both of the active materials, namely, the calcium sheet anode material 66 or the depolarizer 62 are exhausted, or until the heat provided by the heat sources 20 has been dissipated to the extent that the electrolyte 19 is no longer molten and susceptive of sustaining the ionic conduction necessary for battery action. This electro-chemical action may subsist for a period of from 30 seconds to 12 minutes for long life batteries, for a period of approximately 1–30 seconds for medium life batteries, or for a fraction of a second or short life batteries.

It is significant to note that by reason of the insulative ring 70 of this invention, which encloses the peripheral portion of at least one of the active electrode materials of each couple, any conductive alloys which form at the interface of one or the other of the active materials and the electrolyte, such as at the interface of the calcium anode sheet 66 and the electrolyte 19, should they flow radially outwardly, are incapable of short-circuiting the electrode assemblies 15 and 17 of the couple. Additionally, if the insulative ring 70 of each couple 14 also encircles the electrolyte 19, as depicted in the preferred embodiment of FIGS 1 and 2, the insulative ring 70 further functions to contain the electrolyte 19 when liquified, between the opposite polarity electrode assemblies 15 and 17 of the couple. By preventing the liquified electrolyte from oozing out from between the opposite polarity electrode assemblies 15 and 17, the internal resistance of the couple is not unduly increased and the output battery voltage thereby decreased.

As those skilled in the art will appreciate, a number of changes and modifications may be made in the preferred embodiment of this invention without departing from the spirit and scope thereof. The insulative ring 70 may enclose the periphery of the active anode material or sheet 66 and additionally, if desired, also enclose the electrolyte 19, in contrast to enclosing the periphery of the active cathode material or depolarizer 62 and, optionally, the electrolyte 19.

It is also contemplated to be within the scope of this invention to use couples comprised of known active materials other than that disclosed, as well as to use other known electrolytes, or to use lithium chloride and potassium chloride electrolytes, having proportions by weight other than the eutectic mixture described, which is preferred because of its low melting point. Suitable substitutes are disclosed in an article by Dr. E. McKee entitled "Thermal Cells," Proceedings—Tenth Annual Battery Research and Development Conference, May 23, 1965, at pages 26–28.

It is also contemplated that the heat sources 20 can be made to combust by directing the flame from a primer or igniter 22 other than down a central cavity formed by the apertures 80 in the components of the couples 14. For example, it is contemplated that the primer 22 may be located such that the flame produced when the primer is actuated is directed along the peripheries of the heat sources 20.

It is also contemplated that the depolarizer 62 and the electrolyte 19 may be fabricated as an integral unit. Such an integral depolarizer and electrolyte unit may be made by compressing a mixture of powdered depolarizer and powdered electrolyte in the required proportions under a pressure of approximately twenty tons per square inch. Such compression is effective to form the powdered depolarizer and electrolyte material into a compressed cohering disc-like mass. With an integral depolarizer and electrolyte, the insulative ring can encircle the other active material to prevent short-circuiting of the electrode assemblies by conductive alloys forming at the interface of encircled active electrode material and the integral electrolyte and depolarizer. Alternatively, and preferably, however, the insulative ring can encircle the integral electrolyte and depolarizer, functioning to prevent oozing of the liquified electrolyte and consequent increases in internal resistance, as well as functioning to prevent short-circuiting of the electrode assemblies by conductive alloys which form at the interface of the unencircled active electrode material and the encircled electrolyte.

Having described the invention, what is claimed is:

1. A thermal battery having an axis along which significant forces are applied in the course of accelerating and/or decelerating the battery in a direction parallel to said axis, said battery comprising
   a planar anode electrode disposed substantially perpendicular to said battery axis and having a marginal section terminating in a peripheral edge;
   a planar cathode electrode disposed substantially perpendicular to said battery axis and spaced from and substantially parallel to said anode electrode, said planar cathode electrode having a marginal section terminating in a peripheral edge adjacent said anode electrode peripheral edge;
   a normally solid, but liquifiable, planar electrolyte interposed between said anode and cathode electrodes, said electrolyte having a marginal section terminating in a peripheral edge disposed adjacent said electrode edges,
   an insulating ring of the same material throughout having
      (a) a central section substantially encircling the peripheral edge of said electrolyte, and
      (b) spaced upper and lower lip sections extending inwardly from and integral with said central section, said upper and lower lip sections substantially overlying said marginal section of said planar electrolyte for electrically isolating adjacent planar electrode edges and preventing said conductive alloys which form at the interface of said electrolyte and at least one of said electrodes from electrically bridging said electrodes and shortcircuiting said battery,
   said insulative ring being dimensioned and constructed to prevent said electrolyte, when liquified and said battery accelerated along its axis, from oozing outwardly from between said planar electrodes and increasing the internal resistance of the battery and adversely affecting output battery voltage.

2. A thermal battery having an axis along which significant forces are applied in the course of accelerating and/or decelerating the battery in a direction parallel to said axis, said battery comprising
   a planar anode electrode disposed substantially perpendicular to said battery axis and having a marginal section terminating in a peripheral edge;
   a planar cathode electrode disposed substantially perpendicular to said battery axis and spaced from and substantially parallel to said anode electrode, said planar cathode electrode having a marginal section terminating in a peripheral edge adjacent said anode electrode peripheral edge;
   a normally solid, but liquifiable, planar electrolyte interposed between said anode and cathode electrodes, said electrolyte having a marginal section terminating in a peripheral edge disposed adjacent said electrode edges;
   a unitary insulative ring of the same material throughout having
      (a) a central section substantially enclosing the peripheral edge of said electrolyte and the peripheral edge of only one of said electrodes, and
      (b) spaced upper and lower lip sections extending inwardly from and integral with said central section, said upper and lower lip sections substantially overlying said marginal sections of said electrolyte and said one of said electrodes, respectively, for electrically isolating adjacent planar electrode edges and preventing conductive alloys which form at the interface of said electrolyte and said electrodes from electrically bridging said electrodes and short-circuiting said battery,
   said insulative ring being dimensioned and constructed to prevent said electrolyte, when liquified and said battery accelerated along its axis, from oozing outwardly from between said electrodes and increasing the internal resistance of the battery and adversely affecting the output battery voltage.

References Cited

UNITED STATES PATENTS

| | | | |
|---|---|---|---|
| Re. 24,408 | 12/1957 | Hack et al. | 136—83 |
| 2,928,890 | 3/1960 | Van Der Grinten et al. | 136—83 |
| 3,055,960 | 9/1962 | Yalom et al. | 136—83 X |
| 3,189,485 | 6/1965 | Panzer | 136—93 |
| 3,258,366 | 6/1966 | Pasquale et al. | 136—100 |
| 3,345,214 | 10/1967 | Zauner et al. | 136—137 |
| 3,370,298 | 2/1968 | Ballaguer | 136—100 |
| 3,404,041 | 10/1968 | Jnami | 136—146 |

ANTHONY SKAPARS, Primary Examiner

U.S. Cl. X.R.

136—90, 163